(12) United States Patent
Yan et al.

(10) Patent No.: US 6,687,294 B2
(45) Date of Patent: Feb. 3, 2004

(54) DISTORTION QUANTIZER MODEL FOR VIDEO ENCODING

(75) Inventors: Yong Yan, Yorktown Heights, NY (US); Kiran Challapali, New City, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 357 days.

(21) Appl. No.: 09/844,457

(22) Filed: Apr. 27, 2001

(65) Prior Publication Data

US 2002/0159521 A1 Oct. 31, 2002

(51) Int. Cl.⁷ .................................................. H04N 7/12
(52) U.S. Cl. .................................................. 375/240.03
(58) Field of Search .......................... 329/307; 341/51; 375/240.01, 240.02–240.07, 240.12–240.16; 704/230; H04N 7/12

(56) References Cited

U.S. PATENT DOCUMENTS

| | | | | |
|---|---|---|---|---|
| 4,580,162 A | * | 4/1986 | Mori | 341/51 |
| 4,639,682 A | * | 1/1987 | Takeuchi | 329/307 |
| 4,811,396 A | * | 3/1989 | Yatsuzuka | 704/230 |
| 6,359,928 B1 | * | 3/2002 | Wang et al. | 375/240.05 |
| 6,408,026 B1 | * | 6/2002 | Tao | 375/240.03 |

OTHER PUBLICATIONS

Ronda, Jose et al., "Rate Control and Bit Allocation for MPEG–4," IEEE Transactions on Circuits and System for Video Technology, Vol 9, No 8, Dec. 1999. (Abstracts).

* cited by examiner

*Primary Examiner*—Richard Lee

(57) ABSTRACT

A video encoder that allows for the selection of a distortion level, comprising: a selection system for selecting a target distortion level; and a system for determining a quantization parameter q that will ensure compliance with the selected target distortion level, wherein the system includes an algorithm for calculating distortion that utilizes a Gaussian distribution having a variance that is a function of the quantization parameter q. The algorithm is based on a distortion model $D(q)=N(a_1q^2+a_2q+a_3, b_1q^2+b_2q+b_3)$, wherein N is a Gaussian distribution and $a_1, a_2, a_3, b_1, b_2$ and $b_3$ are distortion model parameters.

18 Claims, 1 Drawing Sheet

DISTORTION QUANTIZER MODEL FOR VIDEO ENCODING

BACKGROUND OF THE INVENTION

1. Technical Field

The present invention relates to digital communication systems, and more particularly relates to a system and method for modeling distortion as a function of a quantization parameter.

2. Related Art

With the advent of personal computing and the Internet, a huge demand has been created for the transmission of digital data, and in particular, digital video data. However, the ability to transmit video data over low capacity communication channels, such as telephone lines, remains an ongoing challenge.

To address this issue, systems are being developed in which coded representations of video signals are broken up into video elements or objects that can be independently manipulated. For example, MPEG-4 is a compression standard developed by the Moving Picture Experts Group (MPEG) that utilizes a set of video objects. Using this technique, different bit rates can be assigned to different visual objects. Thus, the more important data (e.g., facial features) can be encoded and transmitted at a higher bit rate, and therefore lower distortion, than the unimportant data (e.g., background features).

Because bandwidth is at a premium, one of the important challenges is to be able to efficiently select bit rates that will meet the distortion requirements for each visual object. Ideally, a bit rate should be selected no higher than is necessary to ensure that the distortion for the visual object does not exceed a selected threshold. Unfortunately, because of the number of parameters that can be introduced in such encoding schemes, predicting distortion levels for corresponding bit rates is a complex problem. Accordingly, the process of selecting bit rates for visual objects remains a challenge.

One solution was taught in the paper entitled "Rate Control and Bit Allocation for MPEG-4," by Ronda et al., IEEE Transactions on Circuits and Systems For Video Technology, Vol. 9, No. 8, December 1999, which is hereby incorporated by reference (hereinafter "Ronda"). In Ronda, a model was taught in which distortion D was defined as:

$$D(q) = a_1 q^2 + a_2 q + a_3 + N(0, \sigma^2),$$

Where q is a quantization parameter, N is a Gaussian distribution, and $a_1$, $a_2$, $a_3$ are distortion model parameters. (In MPEG-4 systems, the bit rate is a function of q.) One of the problems associated with this model, however, is that it provides a Gaussian distribution having polynomial mean and constant variance. Thus, it assumes a constant variance Gaussian distribution regardless of the value of q, which is generally inaccurate, particularly in the case of a low bit rate.

Accordingly, a need exists for a system that can more accurately model distortion in an encoding system.

SUMMARY OF THE INVENTION

This invention overcomes the above-mentioned problems, as well as others, by providing a distortion model in which distortion D(q) is calculated as a random variable that has a general Gaussian distribution that is a function of the quantization parameter q.

In a first aspect, the invention provides a method for determining a quantization parameter q that meets a predetermined quality level, comprising the steps of: providing a distortion model $D(q) = N(a_1 q^2 + a_2 q + a_3, b_1 q^2 + b_2 q + b_3)$, wherein N is a Gaussian distribution and $a_1$, $a_2$, $a_3$, $b_1$, $b_2$ and $b_3$ are distortion model parameters; selecting a target distortion level; and calculating the quantization parameter q such that an upper bound of the distortion model D(q) is less than or equal to the target distortion level.

In a second aspect, the invention provides an encoding system having quality level selection capabilities, comprising: a system for selecting a target distortion level; a distortion model, wherein the distortion model determines a distortion level as a function of a quantization parameter, and wherein the distortion model includes a Gaussian distribution having a variance that is a function of the quantization parameter; and a system for calculating the quantization parameter such that the distortion level does not exceed the target distortion level.

In a third aspect, the invention provides a video encoder that allows for the selection of a distortion level, comprising: a selection system for selecting a target distortion level; and a system for determining a quantization parameter that will ensure compliance with the selected target distortion level, wherein the system includes an algorithm for calculating distortion that utilizes a Gaussian distribution having a variance that is a function of the quantization parameter.

In a fourth aspect, the invention provides a program product, stored on a recordable medium, which when executed allows for the selection of a distortion level in an encoding operation, comprising: a selection system for selecting a target distortion level; and a system for determining a quantization parameter that will ensure compliance with the selected target distortion level, wherein the system includes an algorithm for calculating distortion that utilizes a Gaussian distribution having a variance that is a function of the quantization parameter.

BRIEF DESCRIPTION OF THE DRAWINGS

The preferred exemplary embodiment of the present invention will hereinafter be described in conjunction with the appended drawings, where like designations denote like elements, and.

DETAILED DESCRIPTION OF THE INVENTION

Overview

The present invention provides a selective quality communications system that allows a user and/or system to select a quality level (i.e., distortion) for a data object being transmitted. According to communication theory, a communications channel is characterized as having a capacity, which is an upper bound on a bit rate that can be accommodated by the channel with a negligible error rate. In order to transmit compressed data within this available bit rate, some information must be discarded, thus causing distortion in the signal. In general, as the bit rate increases, distortion decreases and vice versa as embodied in rate-distortion theory. Accordingly, identifying a correspondence between bit rate and distortion allows for a more efficient use of the communication channel, especially in the case of low capacity channels such as telephone lines.

Both the bit rate R and distortion D are a function of a quantization parameter q. In MPEG systems, q can be selected from the set of whole numbers 1, 2, ... Q. Adjusting q can change the quantization level, and therefore the bit rate, of a block of DCT (discrete cosine transform) data in a bit stream. Thus, because distortion D is a function of q, the bit rate can be calculated as a function of distortion. However, in order to link bit rate to distortion, one must first accurately define the relationship between distortion D and the quantization parameter q. This invention links the two with a distortion model described below.

Distortion Model

Pursuant to the present embodiment, distortion is modeled as a random variable that has a general Gaussian distribution, which is a function of q, and is given by the general definition:

$$D(q)=N(m(q), \sigma^2(q)),$$

where N is a Gaussian distribution, m(q) is the mean, and $\sigma^2(q)$ is the variance. In a preferred embodiment, the mean and variance are second order polynomial functions of the quantization parameter q, and are given by:

$$m(q)=a_1q^2+a_2q+a_3, \text{ and}$$

$$\sigma^2(q)=b_1q^2+b_2q+b_3,$$

where $a_1$, $a_2$, $a_3$, $b_1$, $b_2$ and $b_3$ are distortion model parameters, which can be solved, for instance by the well known Maximum Likelihood Estimator. Thus, $D(q)=N(a_1q^2+a_2q+a_3, b_1q^2+b_2q+b_3)$. This equation more accurately models the behavior of distortion, particularly in the case of large quantization levels (i.e., small bit rates).

Figure 1:
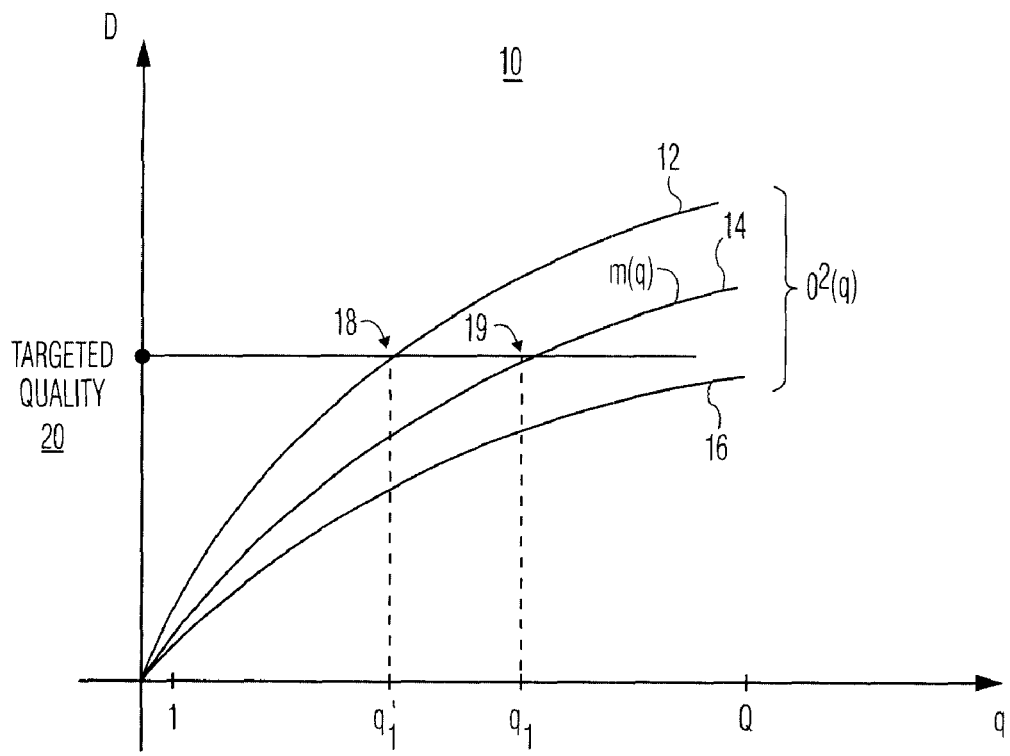
FIG. 1 depicts distortion model curve in accordance with a preferred embodiment of the present invention.

An exemplary curve 10 showing this model is depicted in FIG. 1. As can be seen, the curve 10 includes a variance $\sigma^2(q)$ that is dependent on q. Specifically, as q increases from 1 ... Q, the variance $\sigma^2(q)$ (i.e., the range of possible distortion values) also increases. This can be contrasted with Ronda (described above), which teaches a constant variance. The range of distortion values for a given q includes an upper bound 12, a mean m(q) 14, and a lower bound 16. Upper bound 12 may be defined as:

$$D_{upper}(q)=a_1q^2+a_2q+a_3+\lambda*sqrt(b_1q^2+b_2q+b_3),$$

where $\lambda$ is a confidence level constant (e.g., $3\sigma$).

Selective Quality

Because the distortion model according to this invention accurately defines an upper bound 16 of the curve 10, it is possible to select a targeted quality level 20, and then determine a quantization parameter q that will ensure compliance with the targeted quality level. For example, as shown in FIG. 1, targeted quality level 20 intersects the upper bound of curve 10 at point 18, and intersects the mean m(q) 14 at point 19. Accordingly, for the targeted quality level 20, it is known that selecting quantization parameter value $q_1'$ will ensure that the distortion does not exceed the upper bound 12 of curve 10. Thus, it is possible to choose a targeted quality level 20 and then determine a value q that will guarantee that the distortion does not exceed the targeted quality level.

Figure 2:
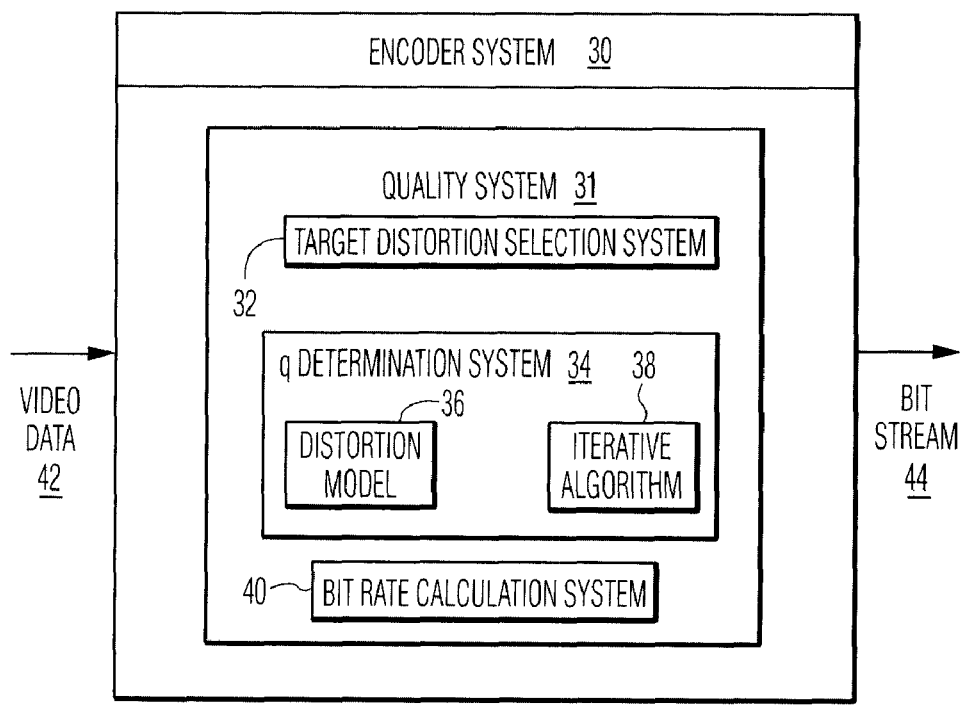
FIG. 2 depicts an encoder system having a quality selection system in accordance with the present invention.

FIG. 2 depicts an encoder system 30 that includes a quality system 31 for achieving selective quality. Encoder system 30 may comprise any type of system (e.g., an MPEG-4 encoder) that encodes digital data for transmission over a communication channel. Encoder system 30 receives video data 42, such as a video object in an MPEG-4 system, and outputs a bit stream 44 that has been encoded with a bit rate suitable for meeting a selected quality (i.e., distortion) level. Quality system 31 includes a target distortion selection system 32 that allows a user or system to select a distortion level that video data 42 must comply with. Distortion may be selected, measured and implemented in any known fashion, including as a root mean square (rms), where $rms(q) \approx N(m(q), \sigma^2(q))$.

Quality system 31 further includes a q determination system 34 for determining a quantization parameter q that will ensure compliance with the selected target distortion level. q determination system 34 includes a distortion model 36 that determines a distortion level as a function of the quantization parameter q. More particularly, the distortion model 36 includes a Gaussian distribution having a variance that is a function of the quantization parameter q. An exemplary embodiment for such a model is described above. The model 36 may be implemented as an algorithm that calculates an upper bound of distortion for an inputted q. For example, as discussed above, an upper bound $D_{upper}$ maybe defined as:

$$D_{upper}(q)=a_1q^2+a_2q+a_3+\lambda*sqrt(b_1q^2+b_2q+b_3).$$

In order to identify the appropriate q to meet a selected distortion level, an iterative algorithm 38 may be utilized that iteratively tests each of the set of sequential q values until, for example, the upper bound of D(q) is less than or equal to the selected target distortion level. The following is exemplary pseudo-code for iterative algorithm 38 where rms≈D:

input selected quality level $rms_0$;
    start loop q from 31 to 1
        if $rms(q) \leq rms_0$, then
        q'=q;
    end.

Once q' is identified, then bit rate calculation system 40 can be used to determine the associated bit rate necessary to implement q'. As noted above, since bit rate is a function of q, bit rate calculation system 40 can be readily implemented in any known manner.

It is understood that the systems, functions, mechanisms, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention have been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

What is claimed is:

1. A method for determining a quantization parameter q that meets a predetermined quality level for video encoding, comprising the steps of:

providing a distortion model $D(q)=N(a_1q^2+a_2q+a_3, b_1q^2+b_2q+b_3)$, wherein N is a Gaussian distribution and $a_1$, $a_2$, $a_3$, $b_1$, $b_2$ and $b_3$ are distortion model parameters;

selecting a target distortion level;

calculating the quantization parameter q such that an upper bound of the distortion model D(q) is less than or equal to the target distortion level; and using the quantization parameter q for said video encoding.

2. The method of claim 1, comprising the further step of determining a bit rate based on the calculated quantization parameter q.

3. The method of claim 1, wherein the quantization parameter q is selected from a set of sequential values 1, 2, 3 . . . Q, and wherein Q is a whole number.

4. The method of claim 3, wherein the step of calculating the quantization parameter q includes the steps of iteratively testing each of the set of sequential values from Q to 1 until the upper bound of D(g) is less than or equal to the selected target distortion level.

5. The method of claim 1, wherein the distortion model D(q) is represented as a root mean square RMS(q).

6. The method of claim 1, wherein the distortion model parameters are estimated using a maximum likelihood estimator statistical method.

7. The method of claim 1, wherein the upper bound of the distortion model D(q) is calculated as: $D(q)=a_1q^2+a_2q=a_3+\lambda*sqrt(b_1q^2+b_2q+b_3)$, and wherein $\lambda$ is a confidence level constant.

8. An encoding system having quality level selection capabilities, comprising:

a system for selecting a target distortion level;

a distortion model, wherein the distortion model determines a distortion level as a function of a quantization parameter, and wherein the distortion model includes a Gaussian distribution having a variance that is a function of the quantization parameter; and a system for calculating the quantization parameter such that the distortion level does not exceed the target distortion level.

9. The encoding system of claim 8, further comprising a system for calculating a bit rate as a function of the calculated quantization parameter.

10. The encoding system of claim 8, wherein the distortion model is defined as:

$$D(q)=N(a_1q^2+a_2q+a_3, b_1q^2+b_2q+b_3),$$

wherein q is the quantization parameter, N is a Gaussian distribution, and $a_1$, $a_2$, $a_3$, $b_1$, $b_2$ and $b_3$ are distortion model parameters.

11. The encoding system of claim 10, wherein an upper bound of the distortion level is defined by the distortion model as:

$$D_{upper}(q)=a_1q^2+a_2q+a_3+\lambda*sqrt(b_2q^2+b_2q+b_3),$$

wherein $\lambda$, is a confidence level constant.

12. The encoding system of claim 10, further comprising a system for estimating the distortion model parameters.

13. The encoding system of claim 8, wherein the system for calculating the quantization parameter utilizes an algorithm that iteratively tests whole number quantization parameter values.

14. A video encoder that allows for the selection of a distortion level, comprising:

a selection system for selecting a target distortion level; and a system for determining a quantization parameter that will ensure compliance with the selected target distortion level, wherein the system for determining includes an algorithm for calculating distortion that utilizes a Gaussian distribution having a variance that is a function of the quantization parameter.

15. The video encoder of claim 14, further comprising a system for selecting a bit rate as a function of the quatization parameter.

16. The video encoder of claim 14, wherein an upper bound of distortion $D_{upper}$ for a given quantization level q is calculated as follows:

$$D_{upper}(q)=a_1q^2+a_2q+a_3+\lambda*sqrt(b_1q^2+b_2q+b_3),$$

wherein $a_1$, $a_2$, $a_3$, $b_1$, $b_2$ and $b_3$ are distortion model parameters, and $\lambda$ is a confidence level constant.

17. The video encoder of claim 14, wherein distortion D for a given quantization level q is calculated as follows:

$$D(q)=N(a_1q^2+a_2q+a_3, b_1q^2+b_2q+b_3),$$

wherein N is a Gaussian distribution, and $a_1$, $a_2$, $a_3$, $b_1$, $b_2$ and $b_3$ are distortion model parameters.

18. A program product, stored on a recordable medium, which when executed allows for the selection of a distortion level in an encoding operation, comprising:

a selection system for determining for selecting a target distortion level; and a code for determining a quantization parameter that will ensure compliance with the selected target distortion level, wherein the code for determining includes an algorithm for calculating distortion that utilizes a Gaussian distribution having a variance that is a function of the quantization parameter.

* * * * *